No. 705,642. Patented July 29, 1902.
S. BRUCKMANN.
MILK PAIL.
(Application filed Oct. 3, 1901.)
(No Model.)
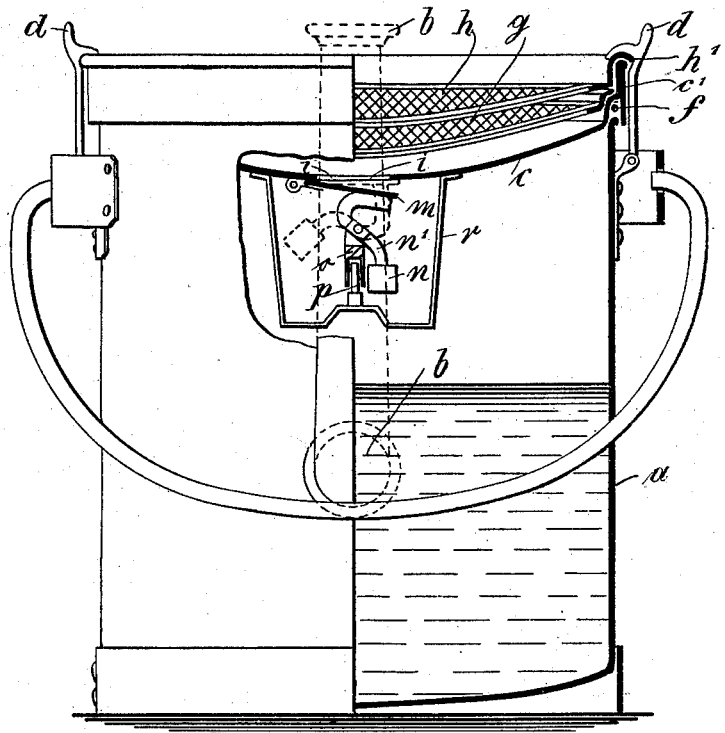
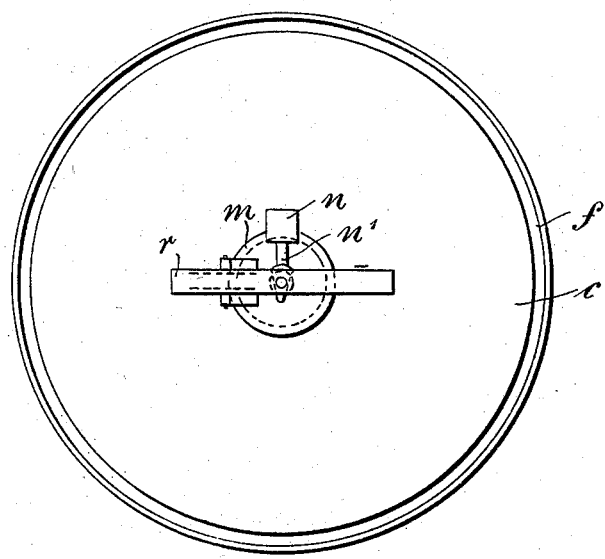
Witnesses:
Inventor:
Salomon Bruckmann,
by his attorneys:
THE NORRIS PETERS CO., PHOTO-LITHO., WASHINGTON, D. C.

UNITED STATES PATENT OFFICE.

SALOMON BRUCKMANN, OF CREFELD, GERMANY.

MILK-PAIL.

SPECIFICATION forming part of Letters Patent No. 705,642, dated July 29, 1902.

Application filed October 3, 1901. Serial No. 77,455. (No model.)

*To all whom it may concern:*

Be it known that I, SALOMON BRUCKMANN, a subject of the King of Prussia, Emperor of Germany, residing at Crefeld, in the Rhine Province, in the German Empire, have invented new and useful Improvements in Milking-Pails, of which the following is a specification.

The subject of the present invention is a milking-pail of cylindrical form closed at the top by a funnel carrying sieves. The funnel communicates with the interior of the pail proper by means of a central opening closable by the aid of a flap, the arrangement being such that should the pail be accidentally overturned a pivotal sliding lever closes the said opening automatically, thus preventing the milk from running out of the pail.

The annexed drawings illustrate one construction of the invention.

Figure 1 is a side elevation, partly in section, of the new pail; and Fig. 2, an under side view of the funnel with closing device.

The milking-pail $a$ is of cylindrical form and is provided laterally with an outlet-pipe $b$, Fig. 1, closed by a screw-cap or the like, so that the pail can be emptied without removal of the funnel $c$. The latter dips into the pail, its peripheral rim $c'$ resting upon the top edge of the pail and being secured by means of hinged catches $d$, a gasket of suitable material $f$ being inserted to make a tight joint. Since the funnel is located inside the pail, the arrangement admits of the latter being more conveniently placed in relation to the udder, while the sieves themselves can be made of practically the same diameter as the vessel itself, thus presenting a larger surface to receive the milk. The sieves $g$ and $h$ are removable, the lip $h'$ of the upper sieve $h$ gripping over the rim of the funnel, so that no particles of foreign matter can get into the milk and render it impure.

Centrally of the funnel is an opening $i$, forming a passage between funnel and pail proper. Below this aperture is a hinged flap $m$, which in its normal position leaves the aperture $i$ open, but which should the pail be upset automatically closes the said aperture. The self-acting device consists of a lever $n'$, loaded by means of a weight $n$ on one arm and pivoted to a sleeve $o$ in such manner that in its normal position its bent upper end bears against the bottom of the flap $m$. The sleeve $o$ slides on a vertical pin $p$, secured to a stirrup $r$, fixed to the bottom of the funnel. Should the pail $a$ be overturned, the lever $n'$, with sleeve $o$, automatically turns on its pivot $p$, taking up a position, as shown by the dotted lines in Fig. 1, whereby the flap $m$ closes the aperture $i$.

It will be obvious that in place of the particular receptacle above described the funnel device can also be applied to other suitable milk-pails of ordinary construction. The sieves shown can in some cases be dispensed with or an ordinary sieve of suitable size be applied to the top of the pail when milking.

Having thus described my invention, what I claim as new, and desire to secure by Letters Patent, is—

A milking-pail comprising a receptacle having a perforated funnel located at the top, a hinged flap controlling the communication between funnel and receptacle, and a device for automatically closing said flap on the pail being overturned, consisting of a stirrup secured to the bottom of said funnel and provided with a vertical pin, a sleeve turning and sliding on said pin, and a weighted double-armed lever pivoted to said sleeve and in its normal position supporting the flap in open condition, all substantially as described.

In testimony whereof I have signed this specification in the presence of two subscribing witnesses.

SALOMON BRUCKMANN.

Witnesses:
P. M. PHELPS,
E. KRÜLLS.